United States Patent
Flacke et al.

(10) Patent No.: US 6,496,139 B1
(45) Date of Patent: Dec. 17, 2002

(54) METHOD FOR SIMULATING ECHO SIGNALS FOR DOPPLER RADAR SYSTEMS

(75) Inventors: Joachim Flacke, Markdorf; Bruno Kaiser, Oberschopfheim, both of (DE)

(73) Assignee: Dornier GmbH, Friedrichshafen (DE)

( * ) Notice: Subject to any disclaimer, the term of this patent is extended or adjusted under 35 U.S.C. 154(b) by 0 days.

(21) Appl. No.: 09/720,480
(22) PCT Filed: Jun. 24, 1999
(86) PCT No.: PCT/DE99/01845
§ 371 (c)(1),
(2), (4) Date: Feb. 22, 2001
(87) PCT Pub. No.: WO00/00842
PCT Pub. Date: Jan. 6, 2000

(30) Foreign Application Priority Data

Jun. 27, 1998 (DE) .......................... 198 28 804

(51) Int. Cl.⁷ ................................ G01S 7/40
(52) U.S. Cl. ........................ 342/171; 342/165
(58) Field of Search ................ 342/169, 171, 342/170, 1, 4, 173, 174, 165

(56) References Cited

U.S. PATENT DOCUMENTS

| | | | | |
|---|---|---|---|---|
| 2,922,157 A | * | 1/1960 | McShan | 343/17.7 |
| 3,277,476 A | * | 10/1966 | Sabin et al. | 343/17.7 |
| 3,329,953 A | | 7/1967 | Adams et al. | 343/17.7 |
| 3,935,573 A | * | 1/1976 | Johnson | 343/17.7 |
| 4,660,041 A | * | 4/1987 | Maples et al. | 342/170 |
| 5,223,840 A | * | 6/1993 | Cronyn | 342/170 |
| 5,432,516 A | * | 7/1995 | Cherry et al. | 342/28 |
| 5,457,463 A | * | 10/1995 | Vencel et al. | 342/169 |
| 5,518,400 A | * | 5/1996 | Otoide et al. | 434/4 |
| 6,046,696 A | * | 4/2000 | Blanco | 342/171 |
| 6,067,041 A | * | 5/2000 | Kaiser et al. | 342/171 |
| 6,114,985 A | * | 9/2000 | Russell et al. | 342/169 |

FOREIGN PATENT DOCUMENTS

GB  2 221 590  2/1990

OTHER PUBLICATIONS

Plasberg, "Simulation of Radar Targets", Frequenz 45 (1991) pp. 110–115.
Fliss et al., "Portable Dopler CW–Radar Calibration", Navy Tech. Cat. No. 3806, Navy Technical Disclosure Bulletin, vol. 14, No. 1., Dec. 1988.
Connor, "Modulation", Edward Arnold Publishers, pp. 22–23 (1973).

* cited by examiner

Primary Examiner—Thomas H. Tarcza
Assistant Examiner—Brian K. Andrea
(74) Attorney, Agent, or Firm—Crowell & Moring LLP

(57) ABSTRACT

A method for simulating echo signals for Doppler radar systems having a radar signal transmitted by a first Doppler radar system and received by a second Doppler radar system wherein the signal is subjected to the action of a Doppler frequency shift based upon switching of either an antennae changeover switch or a transmitting and receiving changeover switch at a frequency equivalent to the Doppler frequency shift to be generated and sent back as a simulated echo signal.

10 Claims, 3 Drawing Sheets

METHOD FOR SIMULATING ECHO SIGNALS FOR DOPPLER RADAR SYSTEMS

This application claims the priority of German patent document 198 28 804.2, filed Jun. 27, 1998, the disclosure of which is expressly incorporated by reference herein.

BACKGROUND AND SUMMARY OF THE INVENTION

The invention relates to a process for simulating echo signals for Doppler radar systems.

To check and test Doppler radar systems, radar simulators are frequently used that receive a radar signal of the Doppler radar system to be tested, subject it to the action of a Doppler shift, and then transmit it back again to the radar system.

These simulators usually work according to the following principle illustrated in FIG. 1. The transmitting signal of the Doppler radar system is received by the simulator antenna An and converted to an intermediate frequency (ZF) in the mixer Mi. The reference letters LO stand for the local oscillator that is used to convert into the intermediate frequency. On the ZF plane this signal is subjected to the action of a Doppler frequency in a modulator Mo connected to a transmit/receive isolating circulator CR. The modulator can be constructed as a single mixer in order to generate a double sideband Doppler signal, or it is conceived as a single sideband (ESB) modulator for generating a single sideband Doppler signal. Following the modulation this signal is delayed, if necessary, before it is then converted up again to the radar frequency (HF). The signal that is modulated thus is beamed back over the simulator antenna An to the radar system and can be processed as an echo signal. Such a simulator is described, for example, in "Simulation of Radar Targets", by G. Plasberg, Frequency 45 (1991), pp. 5–6.

U.S. Pat. No. 3,329,953 discloses another process of this class, where the echo signals are simulated by means of a bidirectional phase shifter, which is connected in series to a circulator. The other outputs of the circulator are either terminated by short circuits or connected together by means of an amplifier in order to increase the simulated signal.

The object of the present invention is to provide a process for simulating echo signals for Doppler radar systems that can be realized inexpensively.

The front ends of many Doppler radar systems have single switches, which can be used, for example, to switch over from the transmitting to the receiving branch or which are necessary for activating different antennas. For example, radar systems for the automotive intelligent cruise control AICC have control in many cases over several antennas, between which they can switch.

According to the invention, these switches are used to operate the Doppler radar system itself or its front end as the Doppler simulator. To this end, the switch is switched over at a frequency that is equivalent to the Doppler frequency shift to be simulated.

The process, according to the invention, can be used, in particular, for measurement purposes to check Doppler radar systems.

In addition, the signal generated by the Doppler simulator can also be used as a transponder in accordance with a transponder process. The transponder works together with an identical system, which serves as the interrogator (interrogator). If the radar signal, transmitted by the interrogator, is received by the transponder, the transponder subjects the signal to the action of a Doppler frequency shift and transmits it back to the interrogator. If there are several transponders, the interrogator recognizes the respective transponder by the size of the frequency shift, generated by the transponder.

The advantage of the process of the present invention lies especially in the fact that a switch-exhibiting Doppler radar system can be switched over from the simulator or transponder mode into the normal radar mode. In addition, the simulator or transponder information can be evaluated analogously to the process used to evaluate normal echo signals.

With this inventive process the radar signal can be modulated on the HF plane so that there is no need for a frequency conversion. As a result, the design of the simulator is simple and inexpensive. In addition, an available radar system front end can be used. In this case it is not absolutely necessary to use the same type of radar system. Thus, for example, the front end of an automobile radar system can be used, in principle, as the Doppler simulator for another Doppler radar system.

In addition, the process of the invention offers, in particular, the following advantages:

The Doppler simulation can be carried out irrespective of frequency fluctuations in the signal, transmitted by the radar system; and The signal, transmitted by the radar system, is subjected to the action of a Doppler frequency and can be transmitted back again with almost no delay;

The process can be used for pulse modulated and for continuous wave (CW) signal shapes.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
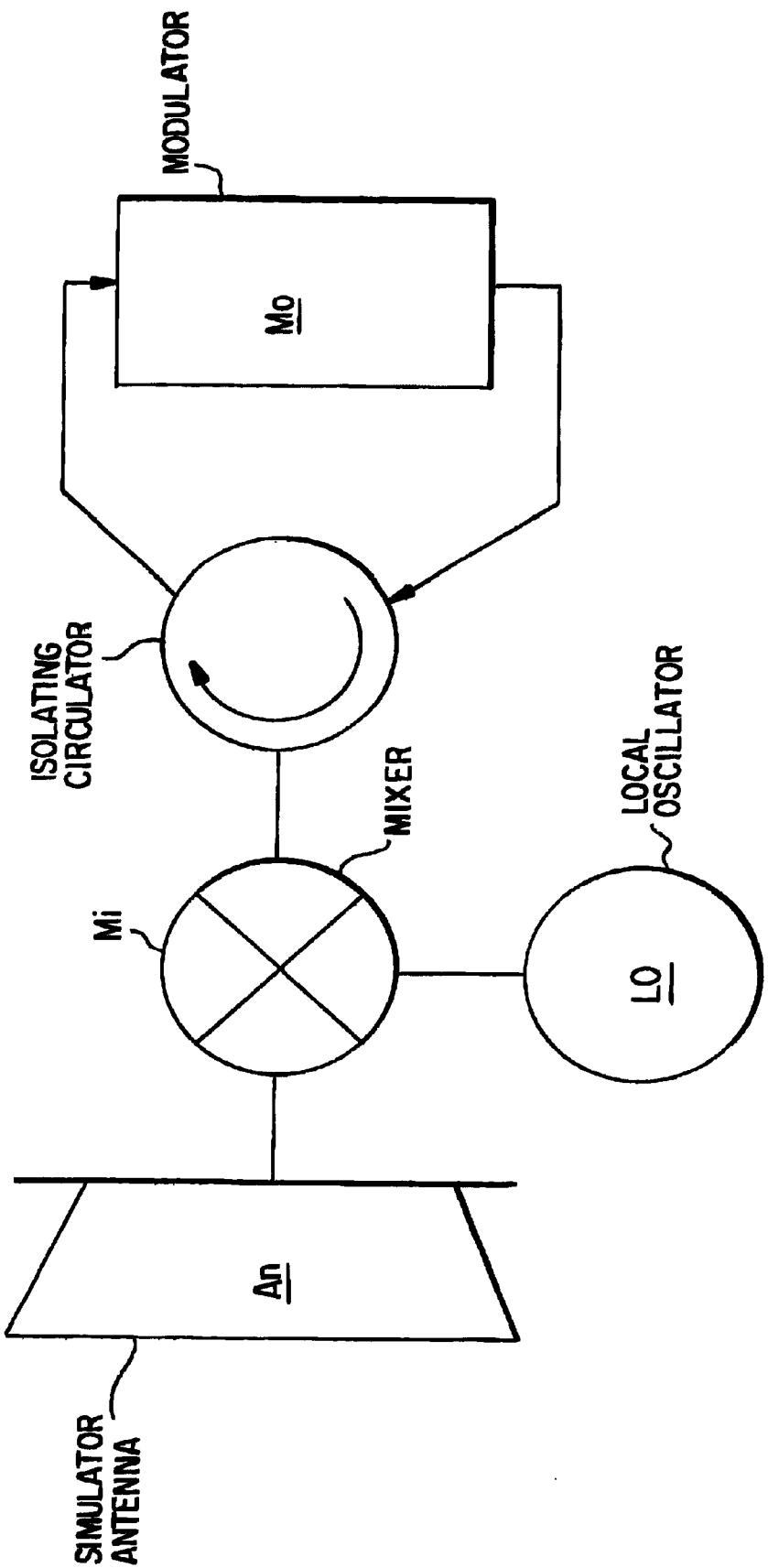
FIG. 1 is a block diagram of a known radar simulator with frequency conversion, as explained in the introductory part of the specification.
Figure 2:
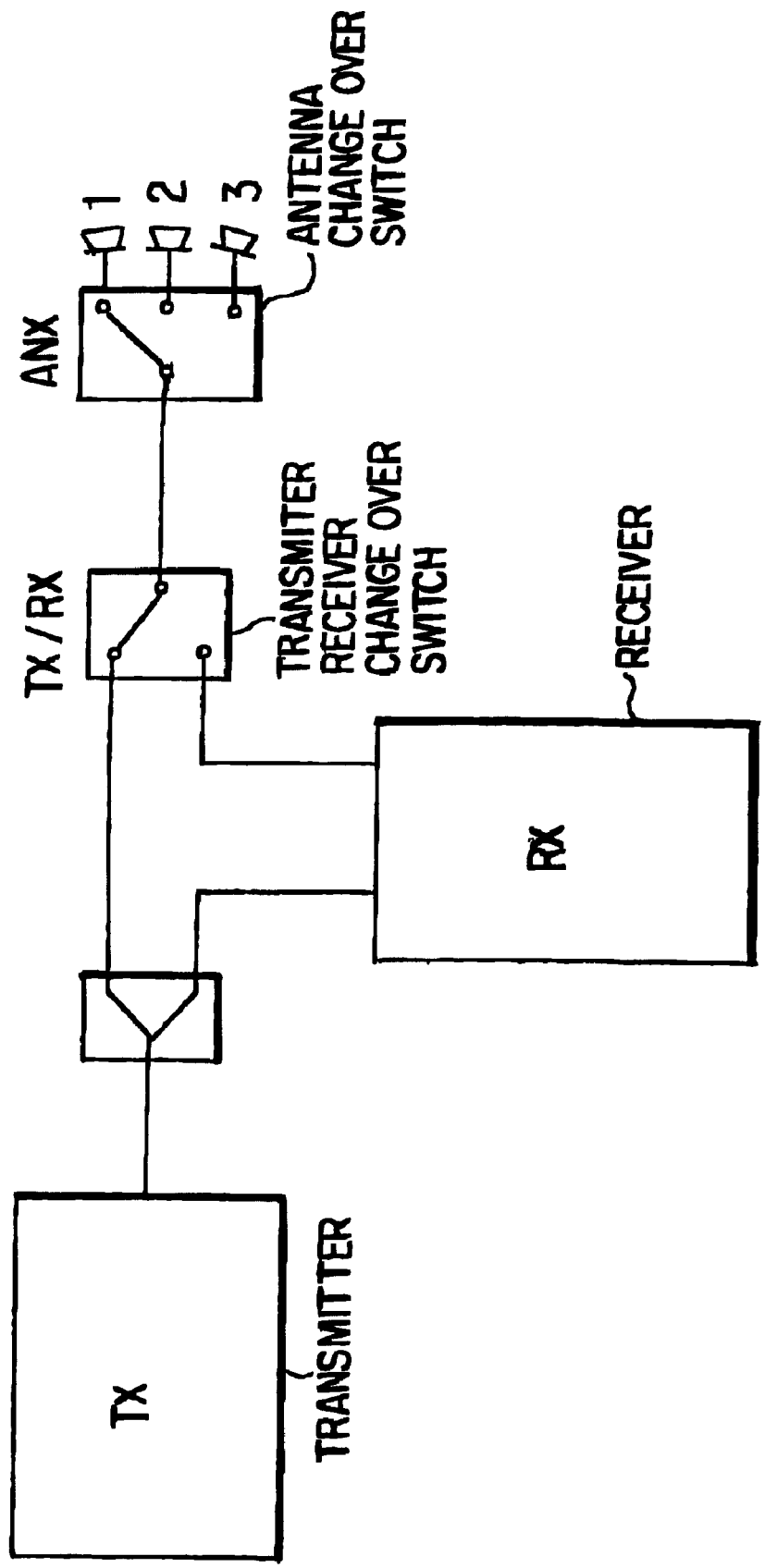
FIG. 2 is a block diagram of a typical Doppler radar system (e.g. automobile radar system), which can be used to carry out the process, according to the invention.

The process flow of the invention is shown in FIG. 2. Depicted is a typical block diagram of a Doppler radar system or its front end for application in an automobile. The transmitting signal, generated in the transmitting part TX, is guided over the transmitting path to a transmitting and receiving change-over switch TX/RX. Behind this change-over switch, the signal goes to the antenna change-over switch ANX, which selects one of the antennas 1, 2, 3. The echo signal is guided over the same antenna change-over switch ANX by means of the transmitting and receiving change-over switch TX/RX to the receiving branch RX, where it is processed and where, among other things, the Doppler information is extracted. The transmitting and receiving change-over switch TX/RX is usually used only in pulsed systems. In FMCW systems the receiving branch is continuously open. The switches can be used independently of each other.

According to the invention, such a system is operated as a Doppler simulator. One of the two switches is clocked at a frequency (for example, by external triggering or modification of the clocking), which is equivalent to the desired Doppler frequency shift. By means of this shift between two different terminations (open←→transmitting or receiving branch) a signal, coming into the antenna and exhibiting two different phase states, is reflected at the clock rate of the change-over switch. This reflected signal, which is subjected to the action of a Doppler shift in accordance with the switching frequency, is emitted again over the antenna.

The three antennas in the illustrated example exhibit different main transmitting directions. When the switch is suitably set, an input signal in antenna 1 is guided over the switch ANX into the transmitting (TX) or receiving (RX) branch of the radar system, depending on the setting of the switch RX/TX. The reflection in this setting of the switch ANX is determined by the switch TX/RX and the subsequent switching step. When the switch ANX is switched over to another antenna 2, 3, the open antenna 1 (no load) determines the reflection of the incident signal. Switching the switch ANX between the two reflections at a frequency $f_D$ results in a regular phase shift of the signal, which is reflected by the arrangement and which becomes apparent in this system as the Doppler shift. In this respect the Doppler frequency is equivalent to the switching frequency $f_D$. The reflected signal is measured as a double sideband signal.

Hence, a radar system, whose transmitting frequency is in the frequency range of the simulator, receives, when beaming at the simulator, the Doppler shifted echo signal. The signal can be analyzed with the algorithm present in customary Doppler radar systems, since the simulated signal is comparable to a Doppler signal, caused by a moving target.

An HF input signal into the simulator, for example of the form $$E_1(t)=E_0*\cos(\omega_0 t),$$

is modulated in accordance with the switching frequency $f_D$ of the switch in the simulator and is emitted again as $$E_R(t)=E_R*\{\cos[(\omega_0-\omega_D)*t]+\cos[(\omega_0+\omega_D)*t]\}$$

Figure 3:
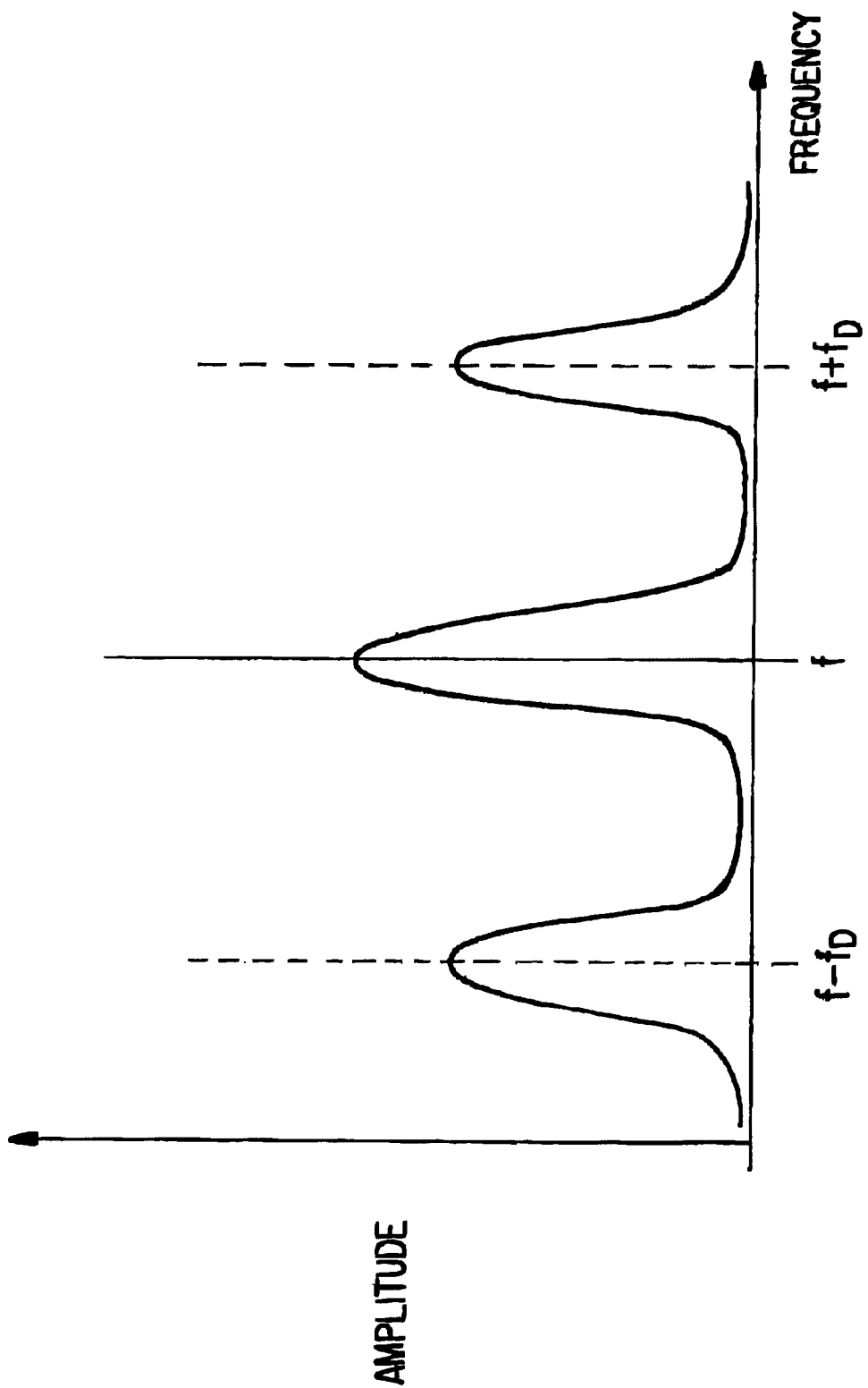
FIG. 3 depicts a typical double sideband Doppler spectrum, generated with the process of the invention.

The signal $E_R(t)$ constitutes a double sideband signal, which is shifted by the modulation frequency $F_D$ from the transmitting frequency in both directions. FIG. 3 shows the typical spectral plot of this signal with f as the carrier frequency and with the sidebands at $f-f_D$, $f+f_D$.

With a suitable design of the selection technique for the switches, the complete Doppler spectrum can be traversed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for simulating echo signals for Doppler radar systems, comprising the steps of:

transmitting a radar signal from a first Doppler radar system;

providing a second Doppler radar system with at least one switch which is switched over at a determined frequency equivalent to a Doppler frequency shift to be generated;

transmitting said determined frequency back to said first Doppler radar system as a simulated echo signal.

2. The process, as claimed in claim 1, characterized in that the switch is an antenna change-over switch.

3. The process, as claimed in claim 1, characterized in that the switch is a transmitting and receiving change-over switch.

4. The process, as claimed in claim 1, characterized in that the simulator is also operated alternatingly as a Doppler radar system or Doppler radar front end.

5. The process, as claimed in claim 1, characterized in that the simulator is used as a transponder inside a transponder process.

6. A process for simulating echo signals for Doppler radar systems, comprising the steps of:

transmitting a radar signal by a first Doppler radar system;

receiving said transmitted signal by a simulator;

subjecting said received signal to the action of a Doppler frequency shift;

transmitting said frequency shifted signal back to said Doppler radar system as a simulated echo signal;

wherein said simulator is a second Doppler radar system, equipped with at least one switch (TX/RX, ANX) and the at least one switch (TX/RX, ANX) is switched over at a frequency (fD) that is equivalent to the Doppler frequency shift to be generated.

7. A method according to claim 6, wherein said switch is an antennae change-over switch.

8. A method according to claim 6, wherein said switch is a transmitting and receiving change-over switch.

9. A process according to claim 6, wherein said second Doppler radar system is alternately operated as a Doppler radar front end.

10. A process according to claim 6, wherein one of said first and second Doppler radar systems is a transponder functioning inside a transponder process.

* * * * *